Jan. 3, 1956

R. K. MULLIN 2,729,309

COMBINED TRAILER HITCH AND HYDRAULIC
BRAKE OPERATING MECHANISM

Filed July 13, 1953

INVENTOR.
Robert K. Mullin
BY
ATTORNEY.

Jan. 3, 1956 R. K. MULLIN 2,729,309
COMBINED TRAILER HITCH AND HYDRAULIC
BRAKE OPERATING MECHANISM
Filed July 13, 1953 2 Sheets-Sheet 2
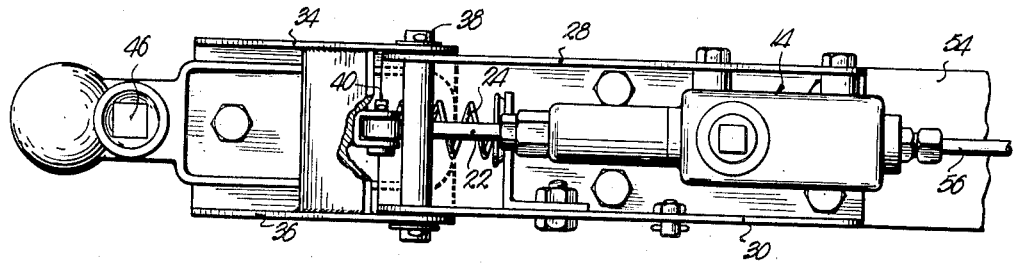
Fig. 3.
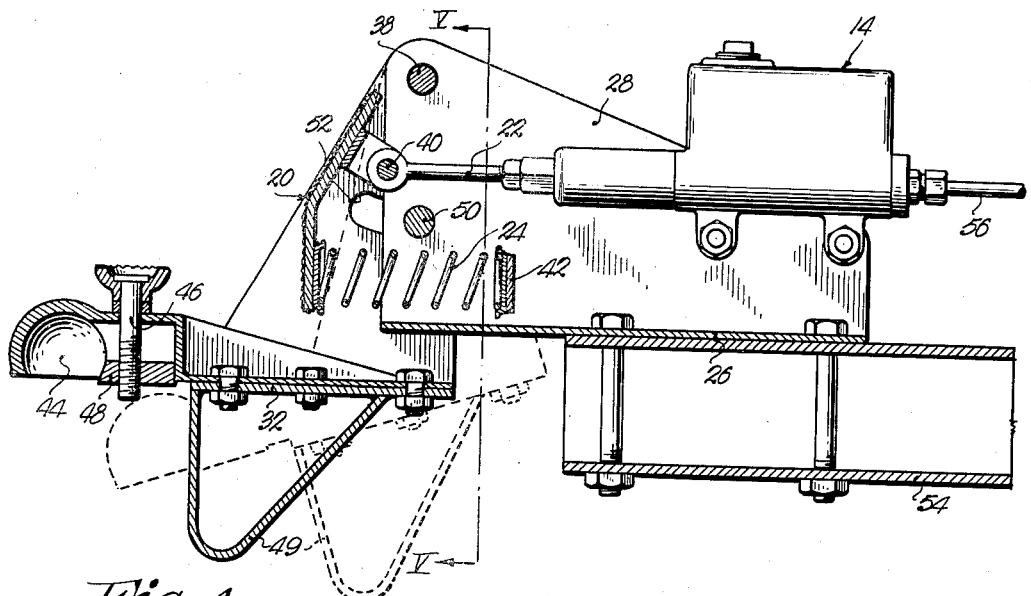
Fig. 4.
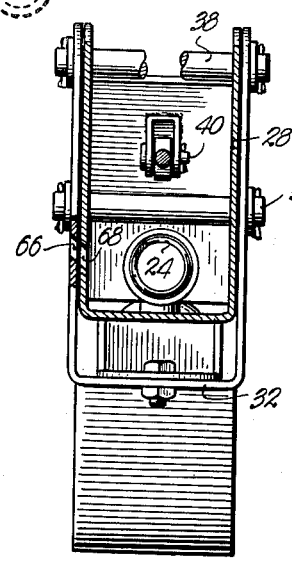
Fig. 5.
INVENTOR.
Robert K. Mullin
BY
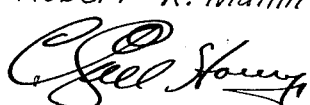
ATTORNEY.

United States Patent Office 2,729,309
Patented Jan. 3, 1956

2,729,309
COMBINED TRAILER HITCH AND HYDRAULIC BRAKE OPERATING MECHANISM

Robert K. Mullin, Muncie, Kans.

Application July 13, 1953, Serial No. 367,535

3 Claims. (Cl. 188—112)

This invention has to do with improvements in mechanism for coupling trailers to towing vehicles and including as a component part thereof means for automatically applying the hydraulic brakes of the trailer in response to the tendency of the trailer to move toward the towing vehicle as the speed of the latter is reduced or stopped.

It is the most important object of the present invention to provide hydraulic brake actuating mechanism for trailers that is highly sensitive to speed changes and, therefore, operable to brake the trailer before the latter tends to impart forward thrust to the vehicle pulling the same, and which, by its sensitivity, is also operable for release of the trailer brakes immediately upon resumption or increase of speed.

Another important object of this invention is to provide actuating mechanism forming a part of the coupling between a vehicle and a trailer in tow therebehind, the hydraulic mechanism per se being of such nature as to effect operation of the trailer brakes at relatively slow speeds equally as well as at higher speeds.

Other objects include the way in which the hydraulic mechanism hereof is simple, inexpensive and positive in its operation; the way in which the master cylinder of the trailer brake system is operably coupled with a swingable bracket that is in turn mounted on a support secured to the trailer; the way in which the bracket which carries a coupling for attaching the same to a tow bar or the like is spring-loaded to normally hold the trailer brakes inoperative; the manner of guiding the swingable bracket through its path of travel with respect to the support upon which it is pivotally mounted; and other important details of construction all of which will be made clear as the following specification progresses.

In the drawings:

Fig. 3 is a top plan view thereof.

Fig. 4 is a vertical, cross-sectional view therethrough; and

Fig. 5 is a transverse, cross-sectional view taken on line V—V of Fig. 4.

Figure 1:
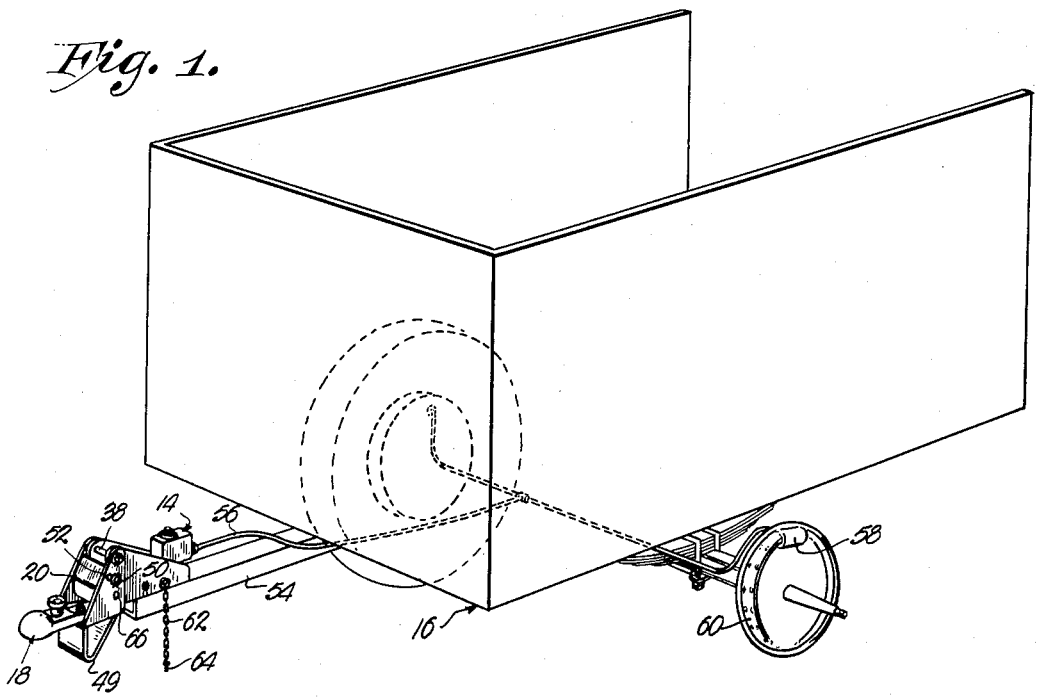
Figure 1 is a perspective view of a trailer showing the hydraulic brake system thereof and the combined trailer hitch and hydraulic brake operating mechanism of the present invention operably mounted on the trailer tongue.
Figure 2:
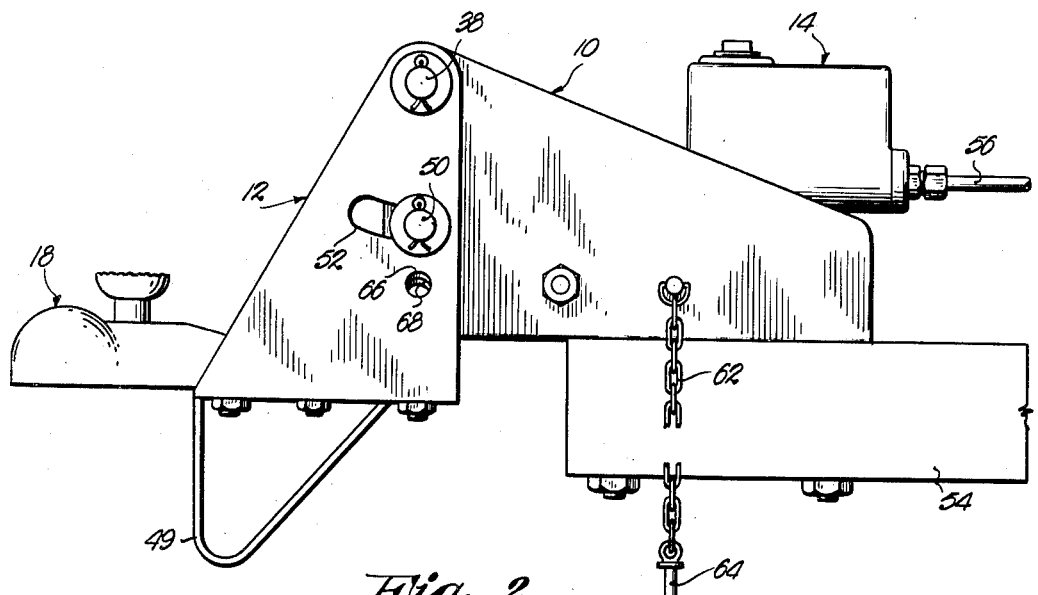
Fig. 2 is an enlarged, side elevational view of the mechanism, together with a portion of the trailer tongue upon which it is mounted.

The mechanism shown in the drawings includes as the primary component parts thereof, a support 10, a bracket 12, a master cylinder 14 for for the hydraulic brake system of trailer 16, a coupling 18 adapting the bracket 12 for connection with a towing vehicle; a cross element 20 for connecting the piston rod 22 of cylinder 14 to the bracket 12, and a spring 24 for yieldably holding the bracket 12 biased to one end of its swinging path of travel.

The support 10 is U-shaped, presenting a bight 26 and a pair of upstanding legs 28 and 30. The bracket 12 is likewise U-shaped presenting a bight 32 and a pair of upstanding arms 34 and 36. Arms 34 and 36 partially embrace the legs 28 and 30 and are swingably interconnected thereto at their uppermost ends by a pivot pin 38.

The master cylinder 14 is bolted to the innermost face of leg 28 and its piston rod 22 is pivotally connected with the cross element 20 by a pin 40. Spring 24 is interposed between cross element 20 and an abutment 42 on the innermost face of leg 30. Cross element 20 is rigidly secured to the arms 34 and 36 therebetween by welding or the like.

Coupling 18 is of conventional character in that the same has a socket 44 for receiving the ball (not shown) of a tow bar or the like, and is clamped thereto through the medium of a bolt 46 having a follower 48 thereon. Coupling member 18 is disposed upon the uppermost face of the bight 32 and is bolted directly thereto. A foot 49 depends from the bight 32 to which it is rigidly secured.

Bracket 12 is guided through its swingable path of travel on the pivot pin 38 by means of a bolt 50 interconnecting the legs 28 and 30 and the arms 34 and 36, said arms being provided with arcuate slots 52 concentric with the pin 38 for clearing the bolt 50. The bight 26 of support 10 rests directly upon tongue 54 of trailer 16 and is bolted thereto. A line 56 for hydraulic fluid leads from the master cylinder 14 to the cylinders of the brakes of trailer 16, one of such cylinders and its associated brake being shown in Fig. 1 and designated by the numerals 58 and 60 respectively.

A chain 62 on the outer face of the leg 30 has a pin 64 thereon which may be extended into openings 66 and 68 when the latter are aligned and which are formed in leg 30 and arm 36 respectively.

The mechanism is normally placed in operation without use of the pin 64 and when the trailer 16 is placed in tow, the piston rod 22 will be held retracted as shown in Fig. 4 of the drawings as aided by the operation of spring 24. When however, the trailer 16 tends to move forwardly relative to the vehicle towing the same, by virtue of reduction in speed of the latter, bracket 12 will swing to the dotted line position shown in Fig. 4, against the action of spring 24 to depress the rod 22 and thereby apply fluid pressure to the cylinders 58 and actuate brakes 60. As soon as bracket 12 returns to the full line position shown in Fig. 4 of the drawings, the hydraulic pressure will be relieved from the cylinders 58 and 14 and the brakes 60 will thereby be released.

In the event that trailer 16 is to be moved in reverse by the vehicle attached thereto, the pin 64 is inserted into the openings 66 and 68 so as to restrain the bracket 12 against swinging movement relative to the support 10 and thereby render the cylinder 14 inoperable from the standpoint of applying fluid pressure to the cylinders 58.

It has been determined by actual tests that mechanism of this type is highly sensitive in its operation so far as applying the brakes 60 is concerned and is responsive to slight forward movements of the trailer 16 relative to the vehicle pulling the same at all speeds and particularly at relatively slow speeds. In this respect, structures of this type heretofore developed, are not particularly satisfactory except in cases where the vehicles travel at highway speeds or where the trailer is loaded and therefore, capable of producing a relatively great amount of forward momentum and inertia.

Having thus described the invention what is claimed as new and desired to be secured by Letters Patent is:

1. Hydraulic trailer brake actuating mechanism comprising a U-shaped support having a bight adapted for rigid mounting upon the tongue of a trailer in overhanging relationship to the tongue and provided with a pair of spaced, upstanding legs; a U-shaped bracket having a bight beneath the bight of the support and a pair of upstanding arms partially embracing the legs at the normally forwardmost end of the support; a horizontal pivot pin interconnecting the legs and the arms at the uppermost ends thereof for swingably mounting the bracket on the support; a coupling member normally aligned with the tongue, said coupling member being rigidly mounted upon the bight of the bracket and extending forwardly therefrom for connecting the bracket to a towing vehicle; a hydraulic cylinder secured to the innermost face of one leg and having a horizontal piston rod extending forwardly therefrom between said pin and said bight of the support and connected with said arms for reciprocable movement thereby as the bracket swings on said pivot pin relative to the support; and a guide member interconnecting the legs beneath the rod, said arms having arcuate guide slots concentric with said pin and slidable on the guide member for limiting the extent of swinging movement of the bracket in both directions.

2. Mechanism as set forth in claim 1 wherein is provided a cross element interconnecting the legs at the forwardmost edges of the latter and forwardly of the support, the rod being pivotally joined to said element.

3. Mechanism as set forth in claim 2 wherein is provided an abutment on the inner face of the other leg and a spring between the abutment and said element and beneath the guide member for yieldably holding the bracket biased toward the forwardmost end of its swinging path of travel.

References Cited in the file of this patent
UNITED STATES PATENTS

| | | |
|---|---|---|
| 2,341,965 | Wagner | Feb. 15, 1944 |
| 2,522,855 | Brown | Sept. 19, 1950 |